(12) United States Patent
Wang

(10) Patent No.: US 7,213,889 B2
(45) Date of Patent: May 8, 2007

(54) STRUCTURE OF A SECURING MEMBER OF A WHEEL COVER

(76) Inventor: Hung-Sheng Wang, No. 29, Lane 766, Sec. 1, Jungjeng Rd., Rende Shiang, Tainan (TW)

( * ) Notice: Subject to any disclaimer, the term of this patent is extended or adjusted under 35 U.S.C. 154(b) by 158 days.

(21) Appl. No.: 11/028,056

(22) Filed: Jan. 4, 2005

(65) Prior Publication Data

US 2006/0145529 A1 Jul. 6, 2006

(51) Int. Cl.
*B60B 7/12* (2006.01)
(52) U.S. Cl. .................................. 301/37.33; 301/37.34
(58) Field of Classification Search ........... 301/37.101, 301/37.102, 37.31–37.34
See application file for complete search history.

(56) References Cited

U.S. PATENT DOCUMENTS

| 5,718,484 | A | * | 2/1998 | Sheu | 301/37.33 |
| 5,752,745 | A | * | 5/1998 | Sheu | 301/37.32 |
| 6,139,114 | A | * | 10/2000 | Wang | 301/37.33 |
| 6,682,150 | B1 | * | 1/2004 | Chen | 301/37.33 |
| 6,789,854 | B2 | * | 9/2004 | Wang | 301/37.33 |
| 2004/0145236 | A1 | * | 7/2004 | Wang | 301/37.101 |
| 2004/0195906 | A1 | * | 10/2004 | Huang Tsai | 301/37.33 |

\* cited by examiner

*Primary Examiner*—Jason R. Bellinger
(74) *Attorney, Agent, or Firm*—Rosenberg, Klein & Lee

(57) ABSTRACT

A wheel cover has a main body, several connecting elements spaced on an inward side of the main body, and coupling pieces used for securing the wheel cover to a wheel. Each connecting element has first and second connecting parts, which have different dimensions. Each coupling piece has a curved protrusion fitted into an annular groove of a wheel, to secure the wheel cover to the wheel. The distance between the curved protrusions and the main body of the wheel cover can be adjusted according to a size of a wheel by relocating each and every one of the coupling pieces to the other one of the connecting parts of a corresponding connecting element.

1 Claim, 6 Drawing Sheets

STRUCTURE OF A SECURING MEMBER OF A WHEEL COVER

BACKGROUND OF THE INVENTION

1. Field of the Invention

The present invention relates to a securing member of a wheel cover, more particularly one, which can be adjusted in the dimensions such that the wheel cover can be used on more different sizes of wheels, and contact of the wheel cover with the tire is prevented, which can cause wear to the tire.

2. Brief Description of the Prior Art

There are two major kinds of wheels, which are iron wheels, and aluminum wheels. Iron wheels aren't very attractive therefore they need to be covered with wheel covers. Aluminum wheels are usually made with patterns and pleasant-looking appearance so as not to need to have covers.

A conventional securing structure of a wheel cover includes several coupling pieces, which are secured on an inward side of the main body of the wheel cover, and each of which has a protrusion on an outward side, and a trench on an inward side; a metallic ring is fitted into the trenches of the coupling pieces, and the wheel cover is secured on a wheel by means of fitting the protrusions of the coupling pieces into an annular groove of the wheel.

The above securing structure of a wheel cover has the following disadvantages:

1. Some people like to use wheel covers of large diameters on the wheels, which have greater diameter than the wheels, such that the tires are partially covered with the wheel covers to look a low aspect ratio tire. Consequently, such large diameter covers will touch and rub against the tires, and the tires are prone to wear faster.

2. A wheel cover with the above securing structure can't be used on a certain wheel whose annular groove is at such a position that the wheel cover will touch the tire when the coupling pieces of the wheel cover are engaged with the annular groove of the wheel. Consequently, such wheel cover can't be used on many different sizes of wheels. In other words, such wheel cover has a relatively limited use.

SUMMARY OF THE INVENTION

It is a main object of the invention to provide an improvement on a wheel cover to overcome the above disadvantages.

The wheel cover of the present invention has a main body, several connecting elements spaced on an inward side of the main body, and coupling pieces used for securing the wheel cover to a wheel. Each connecting element has first and second connecting parts, which have different dimensions. And, each coupling piece has a curved protrusion, which is fitted into an annular groove of a wheel so as to secure the wheel cover to the wheel. The distance between the curved protrusions and the main body of the wheel cover can be adjusted according to a size of a wheel by means of relocating each and every one of the coupling pieces to the other one of the first and the second connecting parts of a corresponding connecting element. Consequently, the distance between the curved protrusions and the main body of the wheel cover can be increased such that touching of the wheel cover with the tire is prevented, which can cause wear to the tire.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
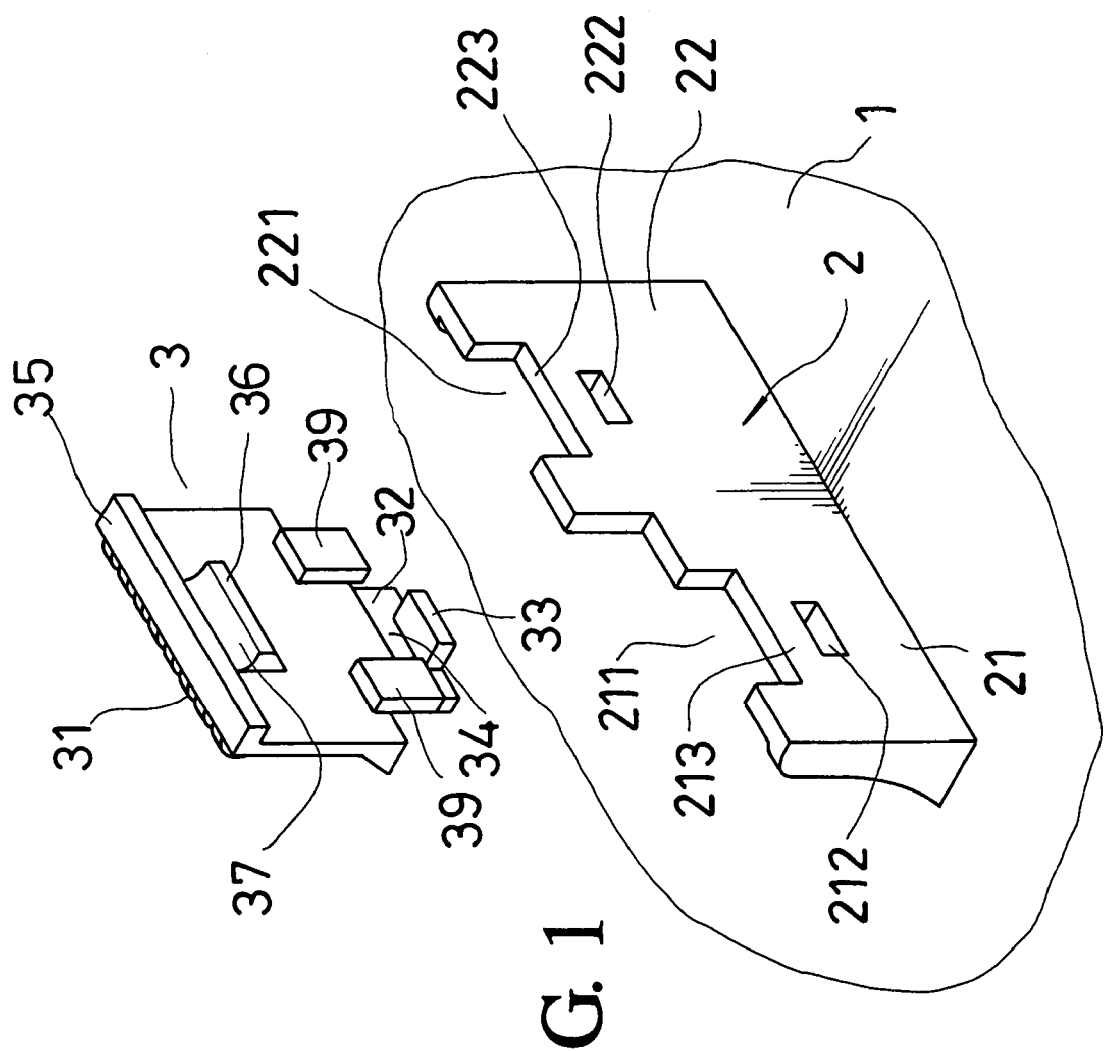
FIG. 1 is a partial exploded perspective view of the first embodiment of a securing member of a wheel cover in the invention.

Referring to FIG. 1, a first embodiment of a securing member of a wheel cover includes several connecting elements 2, and several coupling pieces 3.

The connecting elements 2 are spaced apart around a center of an inward side of a main body 1 of the wheel cover. Each of the connecting elements 2 includes first and second connecting parts 21, 22, which have different dimensions; the first connecting part 21 has a gap 211, a fitting hole 212, and a bar-shaped portion 213 between the gap 211 and the fitting hole 212 while the second connecting part 22 has a gap 221, a fitting hole 222, and a bar portion 223 between the gap and the fitting hole 222.

The coupling pieces 3 are connected to the connecting elements 2 respectively, and used together for securing the wheel cover to a wheel. Each of the coupling pieces 3 has a convexly curved protrusion 31 on an outward side of an upper part thereof, a stopping plate portion 32 connected to a lower end of the upper part, a fitting block portion 33 on an inward side of the stopping plate portion 32, a recess 34 next to the inward side of the stopping plate portion 32 and above the fitting block portion 33, a projection 35 as well as a stopping block 36 on an inward side of the upper part, a fitting trench 37 between the projection 35 and the stopping block 36, and a pair of holding block portions 39 connected to the inward side of the upper part, below the stopping block 36. The convexly curved protrusions 31 of the coupling pieces 3 are to be fitted into an annular groove (not shown) of a wheel so as to secure the wheel cover to the wheel. Furthermore, the stopping plate portions 32 are as wide as the gaps 211, 221 of the connecting elements 2.

Figure 4:
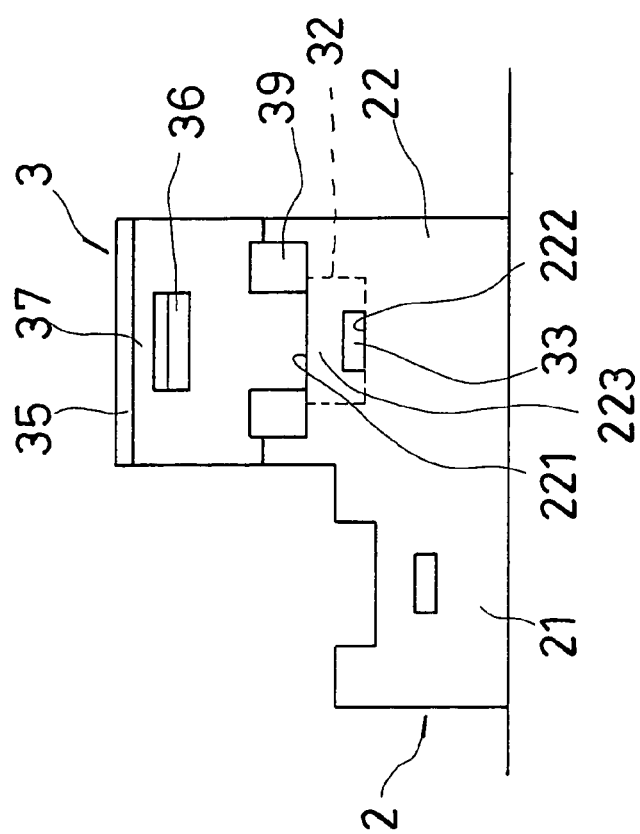
FIG. 4 is a partial front view of the first embodiment, assembled in the second way.
Figure 2:
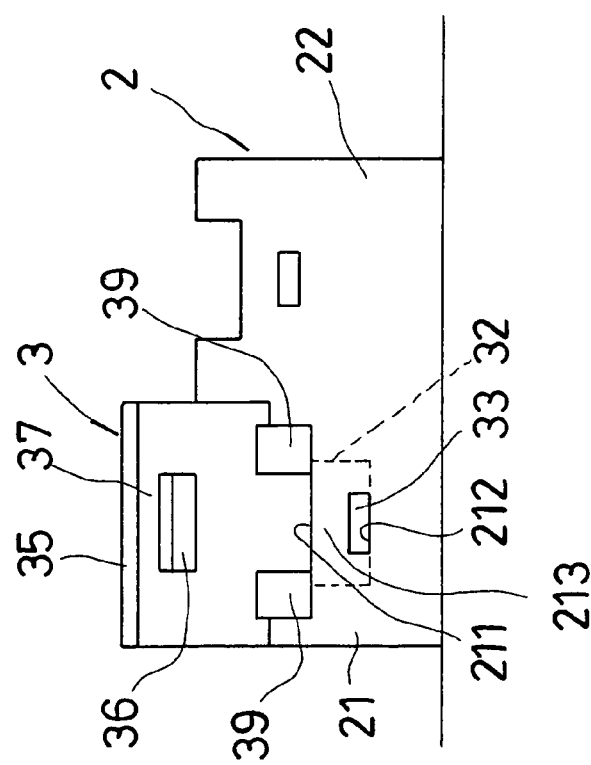
FIG. 2 is a partial front view of the first embodiment, assembled in the first way.
Figure 8:
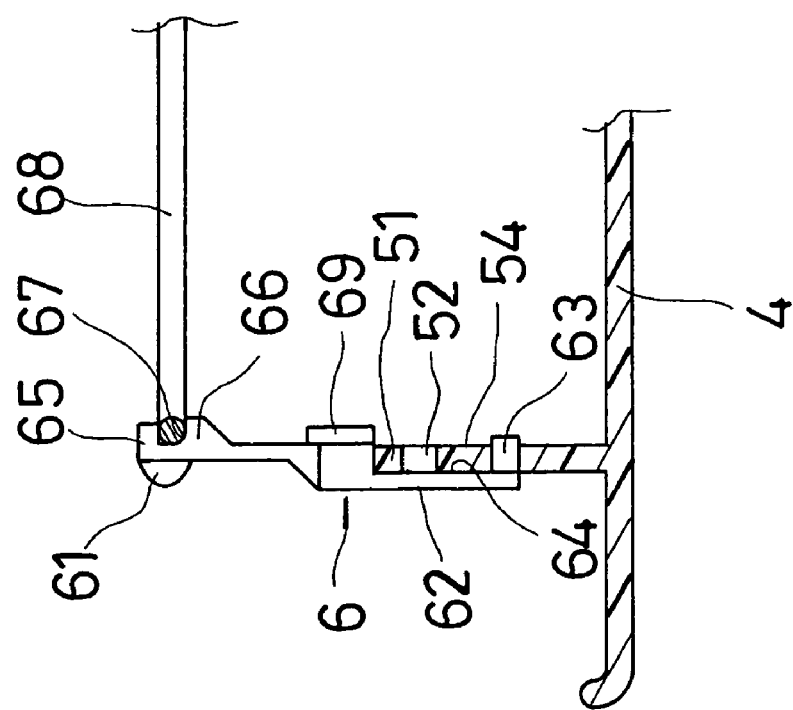
FIG. 8 is a vertical section of the second embodiment, assembled in the first way.
Figure 3:
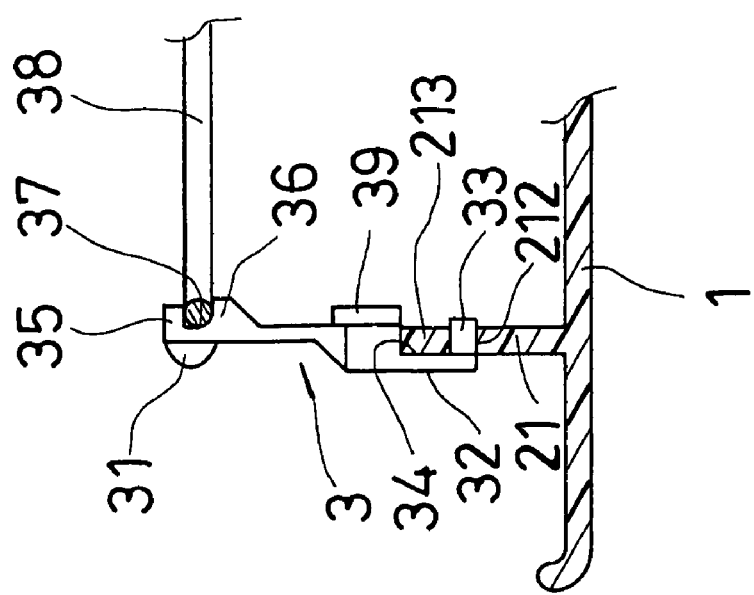
FIG. 3 is a vertical section of the first embodiment, assembled in the first way.

To assemble the securing member, i.e. to secure the coupling pieces 3 on the connecting elements 2, first the coupling pieces 3 are positioned perpendicular to the connecting parts 21 (22), and fitted into the gaps 211 (221) at the stopping plate portions 32 such that the bar-shaped portions 213 are held in the recesses 34, and such that the coupling pieces 3 can't move leftwards or rightwards of the connecting elements 2. Next, the coupling pieces 3 are pivoted on the bar-shaped portions 213 such that the fitting block portions 33 are fitted into the fitting holes 212 (222) of the connecting parts 21 (22), and the holding block portions 39 touch inward sides of the connecting parts 21 (22), as shown in FIGS. 2 to 4; thus, the coupling pieces 3 are connected to the connecting elements 2. Afterwards, a metallic ring 38 is fitted into all of the fitting trenches 37 of the coupling pieces 3.

As shown in FIGS. 2 and 4, the distance between the main body 1 of the wheel cover and the convexly curved protrusions 31 of the coupling pieces 3 will be smaller when the coupling pieces 3 are connected to the first connecting parts 21 of the connecting elements 2 respectively (the first way to assemble the first embodiment of the securing member) while the distance between the main body 1 and the convexly curved protrusions 31 will be greater when the coupling pieces 3 are connected to the second connecting parts 22 respectively (the second way to assemble the first embodiment). Therefore, the dimensions of the securing member can be adjusted for the wheel cover to be usable on many different sizes of wheels by means of relocating each and every one of the coupling pieces 3 to the other one of the connecting parts 21, 22 of a respective connecting element 2.

Figure 5:
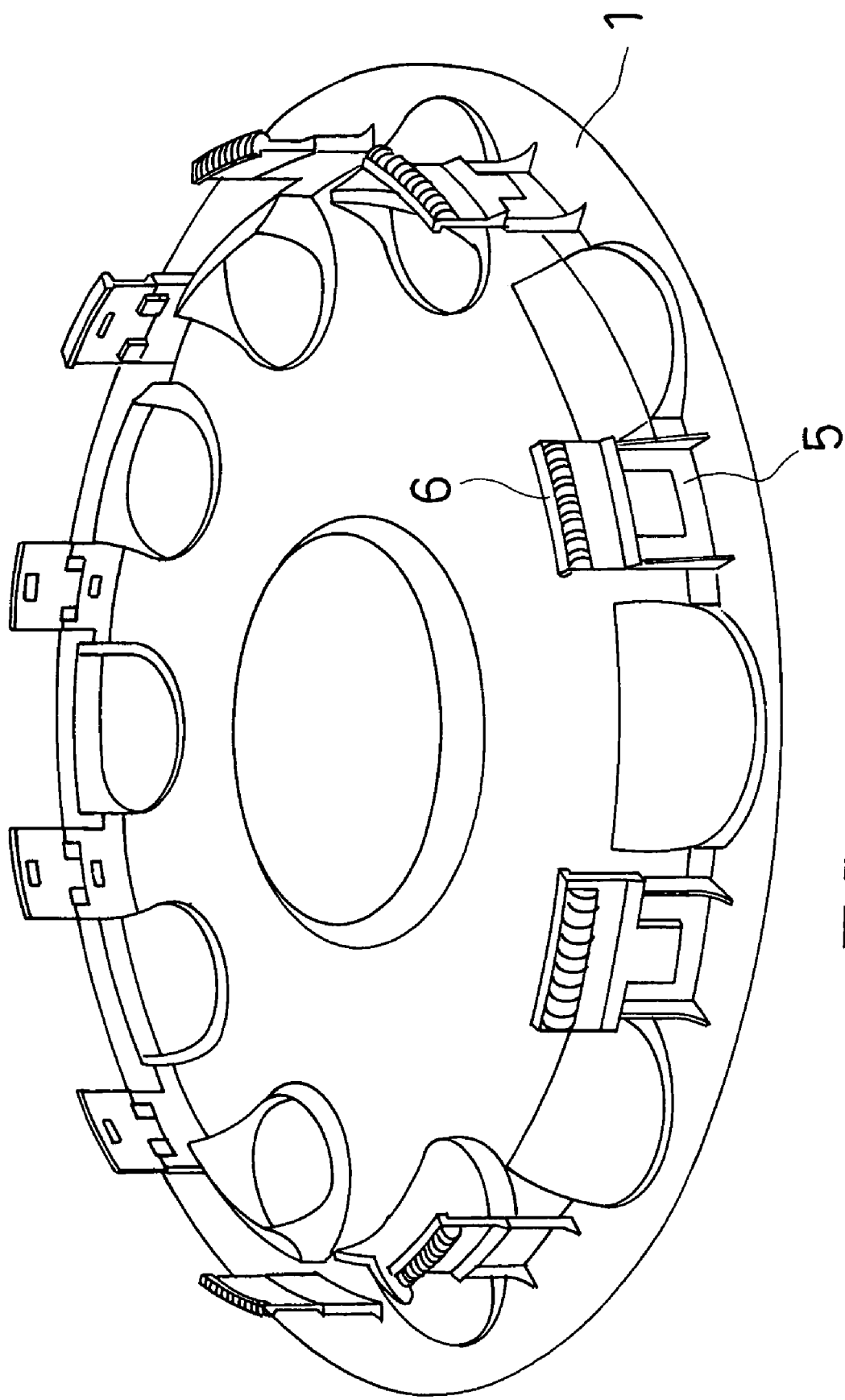
FIG. 5 is a perspective view of the wheel cover according to the second embodiment.
Figure 6:
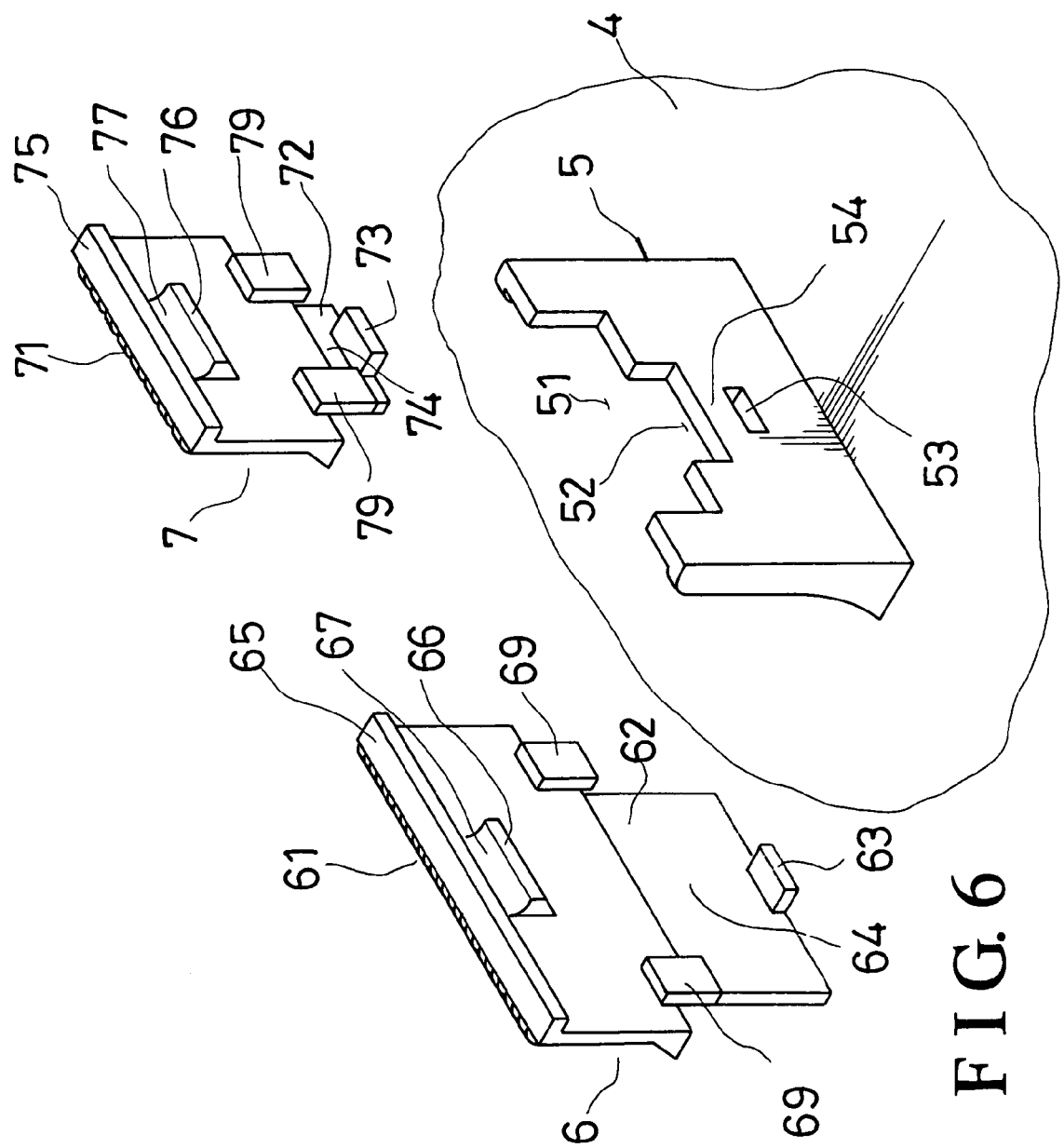
FIG. 6 is a partial exploded perspective view of the second embodiment of a securing member of a wheel cover.

Referring to FIGS. 5 and 6, a second embodiment of a securing member of a wheel cover includes several connecting elements 5, several coupling pieces 6, and several coupling pieces 7.

The connecting elements 5 are spaced apart around a center of an inward side of a main body 4 of the wheel cover. Each of the connecting elements 5 has a first gap 51 at an upper end (according to FIG. 6), a second gap 52 under and in communication with the first gap 51, a fitting hole 53, and a bar-shaped portion 54 between the gap 52 and the fitting hole 53.

Each of the coupling pieces 6 has a convexly curved protrusion 61 on an outward side of an upper part thereof, a stopping plate portion 62 connected to a lower end of the upper part, a fitting block portion 63 on an inward side of the stopping plate portion 62, a recess 64 next to the inward side of the stopping plate portion 62 and above the fitting block portion 63, a projection 65 as well as a stopping block 66 on an inward side of the upper part, a fitting trench 67 between the projection 65 and the stopping block 66, and a pair of holding block portions 69 on the inward side of the upper part, below the stopping block 66. The convexly curved protrusions 61 of the coupling pieces 6 are to be fitted into an annular groove (not shown) of a wheel so as to secure the wheel cover to the wheel if the coupling pieces 6 are used. Furthermore, the stopping plate portions 62 are as wide as the first gaps 51 of the connecting elements 5.

Each of the coupling pieces 7 has a convexly curved protrusion 71 on an outward side of an upper part thereof, a stopping plate portion 72 connected to a lower end of the upper part, a fitting block portion 73 on an inward side of the stopping plate portion 72, a recess 74 next to the inward side of the stopping plate portion 72 and above the fitting block portion 73, a projection 75 as well as a stopping block 76 on an inward side of the upper part, a fitting trench 77 between the projection 75 and the stopping block 76, and a pair of holding block portions 79 on the inward side of the upper part, below the stopping block 76. The convexly curved protrusions 71 of the coupling pieces 7 are to be fitted into an annular groove of a wheel if the coupling pieces 7 are used instead of the coupling pieces 6. Furthermore, the stopping plate portions 72 are as wide as the second gaps 52 of the connecting elements 5.

To secure the coupling pieces 6 on the connecting elements 5, first the coupling pieces 6 are positioned perpendicular to the connecting parts 5, and fitted into the gaps 51 at the stopping plate portions 62 such that the coupling pieces 6 can't move leftwards or rightwards of the connecting elements 5. Next, the coupling pieces 6 are turned so as to fit the fitting block portions 63 into the fitting holes 53 of the connecting parts 5. Afterwards, a metallic ring 68 is fitted into all of the fitting trenches 67 of the coupling pieces 6.

To secure the coupling pieces 7 on the connecting elements 5, first the coupling pieces 7 are positioned perpendicular to the connecting parts 5, and fitted into the gaps 52 at the stopping plate portions 72 such that the coupling pieces 7 can't move leftwards or rightwards of the connecting elements 5. Next, the coupling pieces 7 are turned so as to fit the fitting block portions 73 into the fitting holes 53 of the connecting parts 5. Afterwards, a metallic ring is fitted into all of the fitting trenches 77 of the coupling pieces 7.

Figure 7:
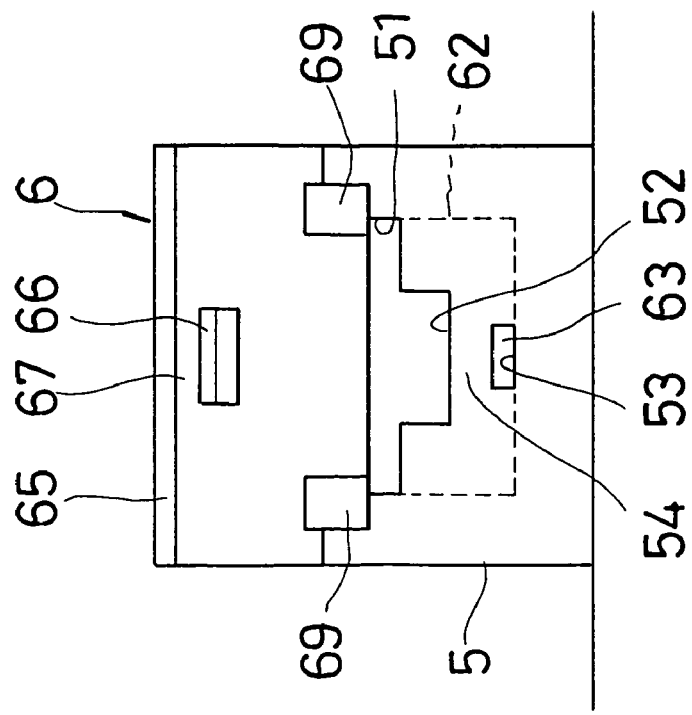
FIG. 7 is a partial front view of the second embodiment, assembled in the first way.
Figure 9:
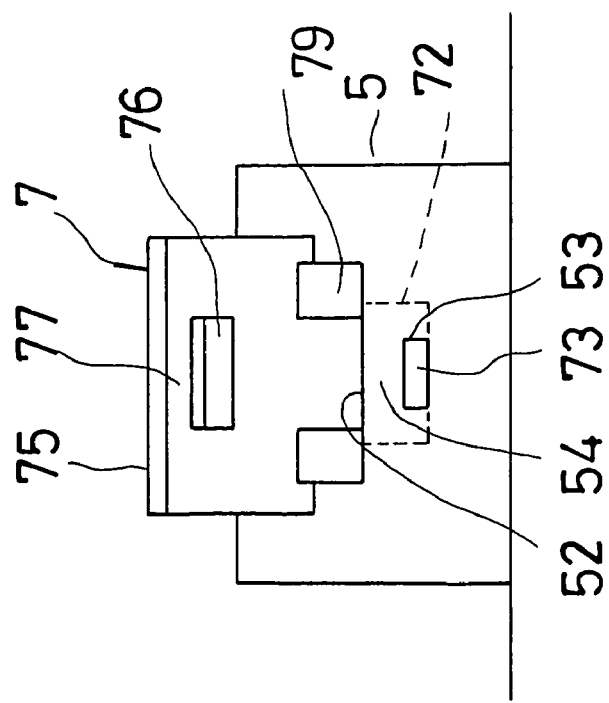
FIG. 9 is a partial front view of the second embodiment, assembled in the second way.

Furthermore, as shown in FIGS. 7 and 9, when the coupling pieces 6 and 7 are connected to the connecting parts 5, the distance between the main body 1 of the wheel cover and the convexly curved protrusions 61 of the coupling pieces 6 will be greater than the distance between the main body 1 and the convexly curved protrusions 71 of the coupling pieces 7. Therefore, the dimensions of the securing member can be adjusted for the wheel cover to be usable on many different sizes of wheels by means of replacing one kind of the coupling pieces 6, 7 with the other kind.

From the above description, it can be easily understood that the present invention has the following advantages:

1. The securing member can be adjusted in the distance between the convexly curved protrusions thereof and the main body of the wheel cover, thus changing the distance between the main body of the wheel cover and a wheel, to which the wheel cover is connected. Consequently, touching of the wheel cover with the tire is prevented, which will cause wear to the tire, and reduce the service life of the tire.

2. Because the securing members of the present invention can be adjusted, each and every one of wheel covers, which are equipped with the present invention, can be adjusted to be usable on more different sizes of wheels. Therefore, the present securing member is convenient to use.

What is claimed is:

1. Securing structure of a wheel cover, comprising:
   a plurality of connecting elements spaced apart around a center of an inward side of a main body of a wheel cover; each connecting element having a first gap at an inward end, and a second gap in communication with the first gap; each connecting element having a fitting hole, and a bar-shaped portion between the second gap and the fitting hole; and
   a plurality of first coupling pieces connected to respective ones of the connecting elements for securing the wheel cover to a wheel;

a plurality of second coupling pieces, which have different dimensions from the first coupling pieces, provided for use as alternatives to the first coupling pieces;

each coupling piece having:

(a) a convexly curved protrusion on an outward side of a first part thereof; the convexly curved protrusion being capable of fitting into an annular groove of a wheel so as to secure the wheel cover to the wheel;

(b) a stopping plate portion connected to an outward end of the first part of the coupling piece and held in the gap of a corresponding connecting element; the stopping plate portions of the first coupling pieces having a same width as the first gaps of the connecting elements; the stopping plate portions of the second coupling pieces having a same width as the second gaps of the connecting elements;

(c) a fitting block portion formed on an inward side of the stopping plate portion and inserted into the fitting hole of a corresponding connecting element;

(d) a recess next to the inward side of the stopping plate portion to receive the bar-shaped portion of a corresponding connecting element;

(e) both a projection and a stopping block on an inward side of the first part; a fitting trench being provided between the projection and the stopping block for fitting a metallic ring therein; and (f) a pair of holding block portions formed on an outward end portion of the inward side of the first part to touch a lateral side of a corresponding connecting element;

whereby a distance between the convexly curved protrusions and the main body of the wheel cover can be adjusted to suit a dimension of the wheel by means of replacing the first coupling pieces with the second coupling pieces.

* * * * *